United States Patent
Dorn et al.

(10) Patent No.: US 8,120,888 B2
(45) Date of Patent: Feb. 21, 2012

(54) GROUNDING APPARATUS FOR GROUNDING OF ELECTRICAL PARTS WHICH ARE INSTALLED IN A ROW

(75) Inventors: Jörg Dorn, Buttenheim (DE); Jörg Hafermaas, Erlangen (DE); Johann Holweg, Zirndorf (DE); Thomas Kübel, Erlangen (DE); Herbert Müller, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 12/520,547

(22) PCT Filed: Dec. 21, 2006

(86) PCT No.: PCT/DE2006/002323
§ 371 (c)(1),
(2), (4) Date: Jul. 23, 2009

(87) PCT Pub. No.: WO2008/074275
PCT Pub. Date: Jun. 26, 2008

(65) Prior Publication Data
US 2010/0059245 A1  Mar. 11, 2010

(51) Int. Cl.
*H05F 3/00* (2006.01)

(52) U.S. Cl. ......... 361/220; 361/221; 361/212; 361/219

(58) Field of Classification Search .................. 361/220, 361/221, 212, 219; 174/5 SG
See application file for complete search history.

(56) References Cited

U.S. PATENT DOCUMENTS

| | | | | |
|---|---|---|---|---|
| 2,375,304 | A * | 5/1945 | Kilduff | 361/212 |
| 4,100,822 | A * | 7/1978 | Rosman | 104/25 |
| 4,664,900 | A * | 5/1987 | Miyazaki et al. | 423/447.3 |
| 4,793,459 | A * | 12/1988 | Forknall et al. | 193/37 |
| 4,918,835 | A * | 4/1990 | Raschbichler et al. | 29/732 |
| 7,450,364 | B2 * | 11/2008 | Parker et al. | 361/220 |
| 2006/0051512 | A1 * | 3/2006 | Orosz et al. | 427/372.2 |
| 2006/0124599 | A1 * | 6/2006 | Braun et al. | 218/118 |

* cited by examiner

*Primary Examiner* — Patrick Salce
(74) *Attorney, Agent, or Firm* — Laurence A. Greenberg; Werner H. Stemer; Ralph E. Locher

(57) ABSTRACT

A device for grounding electrical components arranged in a chain has a grounding point at ground potential and an actuation device connected to the grounding point for connecting the electrical components to the grounding point. In order to provide such a device, with which a simple, safe, and durable grounding is obtained, the actuation device is constructed as a moving part extending in a longitudinal direction and movable in a longitudinal direction. The moving part has an electrically conducting grounding section connected to the grounding point and an electrically nonconducting insulating section arranged on the end of the moving part facing away from the grounding point.

8 Claims, 2 Drawing Sheets

GROUNDING APPARATUS FOR GROUNDING OF ELECTRICAL PARTS WHICH ARE INSTALLED IN A ROW

BACKGROUND OF THE INVENTION

Field of the Invention

The invention relates to an apparatus for grounding of electrical parts which are installed one behind the other in a row, having a grounding point which is at ground potential and having an operating means, which is connected to the grounding point, for connection of the electrical parts to the grounding point.

The invention also relates to a converter for conversion of an electric current having phase modules which have at least one DC voltage connection and one AC voltage connection, with phase module branches being formed between each DC voltage connection and the AC voltage connection and having sub-modules connected in series, with each sub-module having a housing as an electrical part, in which at least one power semiconductor is arranged.

An apparatus such as this and a converter such as this are already known from the popular prior art. Converters which consist of sub-modules connected in series have likewise been described extensively. By way of example, converters such as these are used in power transmission and distribution. In the case of high-voltage direct-current transmission, two converters are connected to one another on the DC voltage side, with each converter being connected to an AC voltage network. In this case, each converter has phase modules, the number of which corresponds to the number of phases of the respectively connected AC voltage network. Each phase module therefore has an AC voltage connection for connection of the respective phase of the AC voltage network, and a DC voltage connection. A phase module branch which comprises sub-modules connected in series extends between the AC voltage connection and each DC voltage connection. Each sub-module has at least one power semiconductor, which is arranged connected in parallel with a freewheeling diode that is connected in the opposite sense.

For maintenance, the electrical parts of the converter, for example the housings of the sub-modules, must be grounded. A contact rod which can be operated by hand or a comb which can be moved to the outside of the housing of the sub-module is normally used for this purpose, with the contact rod or the comb in each case having a grounding point. However, it is very time-consuming to ground the sub-modules by hand. Furthermore, this results in a considerable potential hazard for the maintenance person carrying out the grounding process. In addition, the housing is not continuously grounded during the maintenance work, as a result of which it is impossible to preclude the housing from becoming recharged as a result of a malfunction of the entire sub-module.

BRIEF SUMMARY OF THE INVENTION

The object of the invention is therefore to provide an apparatus of the type mentioned initially, which results in simple, safe and continuous grounding.

The invention achieves this object in that the operating means is in the form of a moving part which extends in a longitudinal direction and moves in a longitudinal direction, the moving part having an electrically conductive grounding section, which is connected to the grounding point, and an electrically non-conductive insulating section which is arranged on the side of the moving part which is remote from the grounding point.

According to the invention, simple grounding is provided for electrical parts which are arranged in a row one behind the other. By way of example, the electrical parts are the housings of a sub-module of a converter. During normal operation of the converter, the insulating section of the operating part rests on the electrical parts or housings, with the insulating section having a dielectric strength which complies with the respective requirements. The dielectric strength, or in other words the withstand voltage, of the insulating section is accordingly matched to the respectively prevailing high voltages. According to the invention, the dielectric strength is likewise designed to be high for higher voltages, in order to reliably avoid creepage currents, partial discharges or the like. For grounding, the moving part is moved in a longitudinal direction, as a result of which the metallically conductive grounding section comes into contact with the housings of the converter modules. The housings are then at ground potential, thus allowing them to be touched safely during maintenance work.

By way of example, the moving part comprises a copper rail, to which an insulating section is attached or on which an insulating section is formed. By way of example, the copper rail is electrically connected via a cable connection and a roller contact, a ribbon conductor or in some other manner to a grounding point, thus allowing the moving part to carry out a movement in a longitudinal direction.

According to one advantageous further development of the invention, the moving part is, however, a flexible movement strand which can be wound. The movement strand has adequate tensile strength, thus allowing it to be moved by introduction of a tensile force relative to the electrical parts. The apparatus is more compact, because of the capability to wind the strand.

According to one expedient further development relating to this, the movement strand is a cable which forms the grouching section at one end and the insulating section at its other end. The grounding section is, for example, equipped as a wire cable, which is connected to a non-conductive plastic cable, as the insulating section.

According to one refinement, which differs from this, the movement strand is a chain which has metallic, that is to say electrically conductive, chain links in its grounding section but has chain links composed of a non-conductive material, for example an insulating plastic, in its insulating section. The insulating section may also be in the form of a cable, with the grounding section being a chain.

According to one further refinement of the invention, the movement strand is in the form of a ribbon.

It is also expedient for a first winding to be provided, which is intended to support the movement strand. The winding allows the inventive apparatus to be handled more easily and, furthermore, it occupies less space.

According to one expedient further development relating to this, a second winding is provided, with the electrical parts being arranged between the first winding and the second winding. In this case, the windings and the movement strand are arranged such that the movement strand extends above the electrical components. During operation, the insulating section rests, for example, on the electrical parts. During maintenance work, the power supply for the electrical parts such as capacitors or the like or for the electrical components that are accommodated in the electrical parts is interrupted. The second winding is rotated by hand or by means of an electrical drive for subsequent grounding. The insulating section is attached to the second winding such that it is first of all wound on the second winding. The electrically conductive grounding section is, however, gradually unwound from the first winding and, finally, extends above the electrical parts. This results in contact between the electrical parts and the grounding section, for example because of the natural weight of the grounding section. Thus, according to the invention, all the electrical parts are grounded at the same time, with the grounding also being maintained during maintenance work.

According to one expedient further development in this context, the electrical parts have sliding contacts. According to one expedient variant in this context, the electrical parts in contrast have roller contacts. The sliding contacts or roller contacts improve the contact between the moving part and the electrical parts. The variant of the invention in which the natural weight of the grounding section ensures the necessary contact costs less, of course.

Further expedient refinements and advantages of the invention are the subject matter of the following description of exemplary embodiments of the invention with reference to the figures of the drawing, in which the same reference symbols refer to parts having the same effect, and in which:

DESCRIPTION OF THE INVENTION

Figure 1:
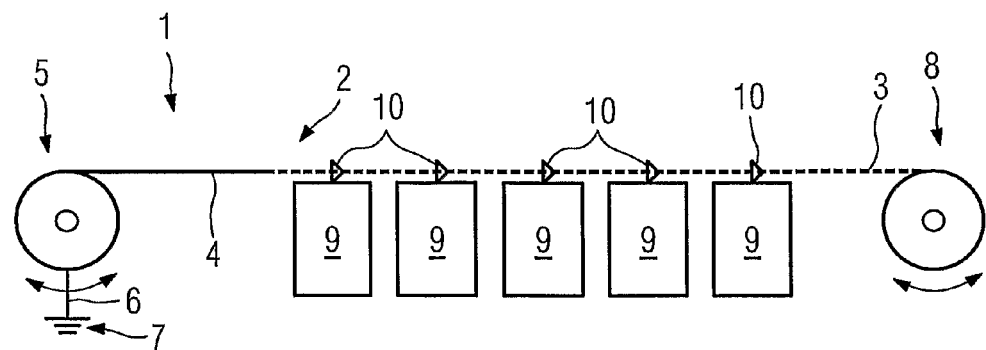
FIG. 1 shows a first exemplary embodiment of an apparatus according to the present invention, which is located in a normal operating position.

FIG. 1 shows one exemplary embodiment of the apparatus 1 according to the invention, with has a moving part 2 which is in the form of a cable and comprises an insulating section 3 and a metallically conductive grounding section 4. Since it is in the form of a cable, the two sections of the moving part 2 are flexible, and they can be wound. The apparatus 1 therefore has a first winding 5 which is mechanically and electrically connected to a grounding point 7 and to the grounding section via a grounding line 6. The grounding point 7 is in this case in the form of a grounding electrode buried in the ground. Furthermore, a second winding 8 is provided, which can be operated by hand or by a winding drive that is not illustrated, and is connected to the insulating section. An electric motor is likewise provided in order to drive the second winding 5.

Housings 9 of sub-modules are arranged in a row as electrical parts of a converter between the first winding 5 and the second winding 8, with the sub-modules being electrically connected in series with one another to form a phase module branch. In this case, the phase module branch extends between a DC voltage connection, which is not illustrated in the drawing in FIG. 1, and an AC voltage connection, which is likewise not illustrated, of the converter. For the purposes of the invention, a total of six of these phase module branches are provided, forming a so-called six-pulse bridge for connection to a three-phase AC voltage network. Six-pulse bridges such as these are very well known by those skilled in the art in the field of power transmission and distribution, and the detailed design and control of converters such as these will therefore not be described in detail at this point. It should just be mentioned that a converter such as this is used, for example, for high-voltage direct-current transmission. Said phase module branches may, however, also be used as quick-action switches in AC voltage networks, being used, for example, for power-factor correction. Applications of this type have also become known under the name "Flexible AC Transmission Systems" or FACTS, for short.

The components arranged in the housings 9, in particular power semiconductors, are at a high-voltage potential of, for example, about 200 kilovolts, during normal operation. In the position shown in FIG. 1, the apparatus 1 is in its operating position, in which the insulating section 3, which is illustrated by dashed lines, is arranged above the housing 9. In this position, the housings 9 are not grounded.

Figure 2:
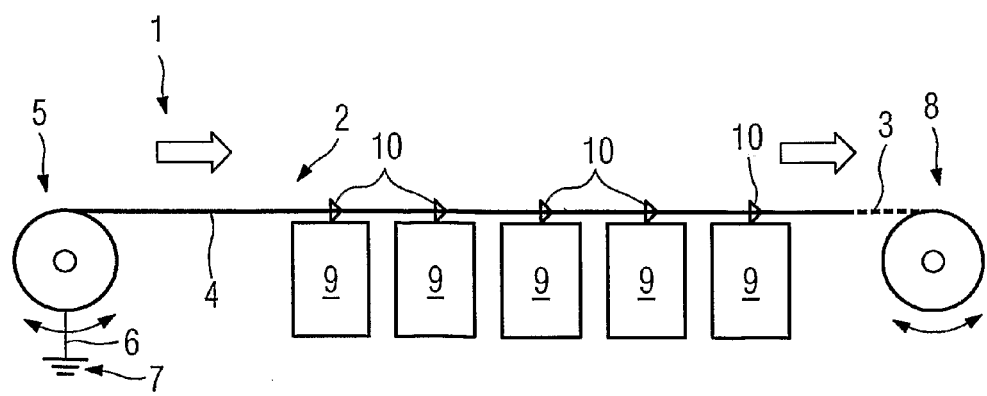
FIG. 2 shows the apparatus shown in FIG. 1 in a grounding position.

FIG. 2 shows the apparatus 1 as shown in FIG. 1 in a position in which the housings 9 are conductively connected to the potential point 7. In order to ground the housings 9, the second winding 8 is rotated in the clockwise direction by the electrical drive, which is not illustrated, with the moving part 2 being moved in the direction of the arrow such that the grounding section is located above the housings 9. A sliding contact 10, which are fitted to the housings 9, are provided in order to make contact with the grounding section 4. The sliding contacts 9 have, for example, expedient spring elements which ensure that a reliable contact is made between the grounding section 4 and the housing 9. In contrast to the exemplary embodiment shown in FIG. 2, the sliding contacts 10 may, however, also be attached to the grounding section 4.

Figure 3:
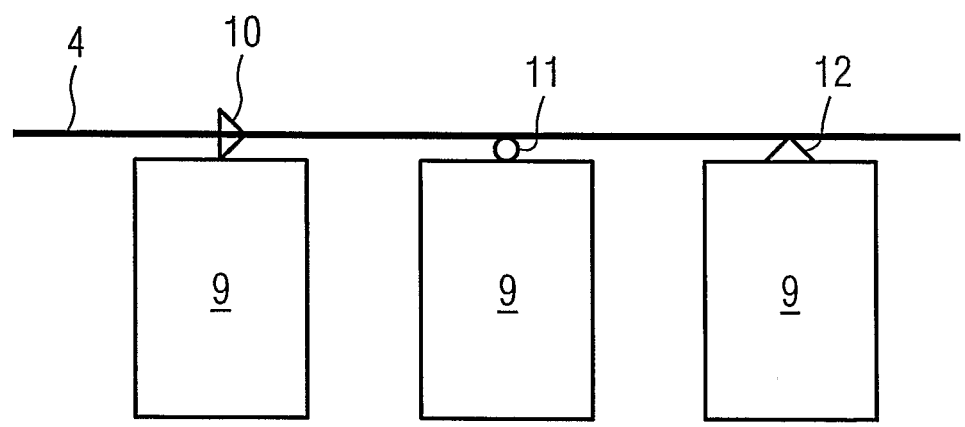
FIG. 3 shows a plurality of exemplary embodiments according to the invention of contact being made between the grounding section and the electrical parts.

FIG. 3 shows a plurality of examples of contact being made between the grounding section 4 and the housings 9. In the right-hand illustration in FIG. 3, as in FIGS. 1 and 2, a sliding contact 10 is shown, whose method of operation has already been described further above. The housing which is located in the center in FIG. 3 is connected by means of a roller contact 11 to the grounding section 4, for example with an expedient bracket or a groove that is incorporated in a roller being provided for guiding the grounding section, which is in the form of a cable. The housing 9 on the right in FIG. 3 has a contact bulge 12 which projects from the roof area of the housing 9 and on which the grounding section 4 rests, by virtue of its natural weight. Contact such as this is advantageous from the cost point of view.

The invention claimed is:

1. An apparatus for grounding a plurality of electrical component parts that are installed one behind the other in a row, the apparatus comprising:
   a grounding point at electric ground potential;
   an operating device connected to said grounding point, for connecting the electrical component parts to said grounding point, said operating device including a moving part extending in a longitudinal direction and being movably disposed in the longitudinal direction;
   said moving part being a flexible and windable movement strand; and
   said moving part having an electrically conductive grounding section connected to said grounding point and an electrically non-conductive insulating section at an end of said moving part distally from said grounding point.

2. The apparatus according to claim 1, wherein said movement strand is a cable.

3. The apparatus according to claim 1, wherein said movement strand is a chain.

4. The apparatus according to claim 1, which comprises a first winding for supporting said movement strand.

5. The apparatus according to claim 4, which comprises a second winding to be installed on a side of said electrical component parts opposite from said first winding.

6. The apparatus according to claim 1, wherein said electrical component parts include sliding contacts.

7. The apparatus according to claim 1, wherein said electrical component parts include roller contacts.

8. A converter for converting an electric current, comprising:

a plurality of phase modules each having at least one DC voltage connection and one AC voltage connection, with phase module branches being formed between each DC voltage connection and said AC voltage connection;

sub-modules connected in series, each of said sub-modules having a housing forming an electrical component part housing at least one power semiconductor; and an apparatus according to claim 1 for grounding said housings or other electrical parts of the converter.

\* \* \* \* \*